United States Patent [19]
Spisak et al.

[11] 3,852,628
[45] *Dec. 3, 1974

[54] RECTIFIER ASSEMBLY FOR BRUSHLESS EXCITATION SYSTEMS

[75] Inventors: Andrew J. Spisak, Bethel Park; Thayer L. Dillman, North Versailles, both of Pa.

[73] Assignee: Westinghouse Electric Corporation, Pittsburgh, Pa.

[ * ] Notice: The portion of the term of this patent subsequent to Mar. 20, 1990, has been disclaimed.

[22] Filed: Sept. 11, 1972

[21] Appl. No.: 287,923

[52] U.S. Cl. ............................................. 310/68 D
[51] Int. Cl. .......................................... H02k 11/00
[58] Field of Search ............ 310/59, 64, 68 R, 68 D; 317/100; 174/DIG. 5

[56] References Cited
UNITED STATES PATENTS

| | | | |
|---|---|---|---|
| 3,160,771 | 12/1964 | Martin et al. | 310/68 R |
| 3,371,235 | 2/1968 | Hoover | 310/68 R |
| 3,590,291 | 6/1971 | Spisak | 310/68 D |
| 3,602,747 | 8/1971 | Stroppa et al. | 310/68 D |
| 3,611,107 | 10/1971 | Ruckel | 321/8 |
| 3,624,452 | 11/1971 | Hayward | 317/100 |
| 3,721,843 | 3/1970 | Spisak et al. | 310/68 |

FOREIGN PATENTS OR APPLICATIONS

| | | | |
|---|---|---|---|
| 1,473,610 | 3/1967 | France | 310/68 D |

*Primary Examiner*—J. D. Miller
*Assistant Examiner*—Harry E. Moose, Jr.
*Attorney, Agent, or Firm*—G. H. Telfer

[57] ABSTRACT

In a brushless excitation system for alternating current generators the rectifier diodes, heat sinks, fuses and other necessary components are assembled in a modular assembly including diodes of opposite polarity, and a plurality of these modules are mounted on a single support wheel and connected in a rectifier bridge circuit to form a rotating rectifier assembly.

16 Claims, 7 Drawing Figures

RECTIFIER ASSEMBLY FOR BRUSHLESS EXCITATION SYSTEMS

BACKGROUND OF THE INVENTION

The present invention relates to brushless excitation systems for alternating current generators, and more particularly to an improved construction and arrangement of the rotating rectifier assembly of such excitation systems.

Brushless excitation systems are now widely used for supplying direct current field excitation to large alternating current generators. Such an excitation system includes an alternating current exciter having a stationary field structure and a rotating armature member. A rotating rectifier assembly is carried on a common shaft with the exciter armature and connected thereto to provide a direct current output. The output of the rectifier is supplied to the field winding of the main generator which also rotates with the exciter armature and rectifier. In this way an excitation system is provided which requires no commutator or slip rings and no sliding contacts.

The rectifier assembly for such an excitation system requires a large number of components including the semiconductor diodes themselves, heat sinks, capacitors, resistors, fuses and the necessary connections and supports. All of these devices must be mounted on a shaft in a manner to be adequately supported against the high rotational forces to which they are subjected in operation and as compactly as possible to minimize the overall size and the space required. This has been done heretofore by mounting the components of the rectifier circuit on the cylindrical inside surfaces of axially extending rims of two support wheels in the manner shown in a patent to Hoover U.S. Pat. No. 3,371,235 or in out U.S. Pat. No. 3,590,291. The arrangements of these patents were intended for diodes of the stud-mounted type and have been satisfactory in service.

More recently semiconductor diodes of the disc type, or pressure contact type, have become available. As disclosed in Petersen, et al U.S. Pat. No. 3,521,132, diodes of this type are very suitable for rotating rectifier assemblies as they have relatively large current carrying capacity and can be cooled on both sides because of their disc shaped configuration, so that they have a greatly increased output for a given volume as compared to previously available diodes. The use of the disc-type diodes is obviously advantageous because of their increased current capacity, but they introduce additional problems of increased heat dissipation and of mounting the diodes in a manner to obtain the proper contact pressure. Since contact to these devices is made on their flat surfaces by pressure contacts, it is necessary to mount them in such a way that when the rectifier assembly is at standstill sufficient force is applied to the diodes to provide the necessary contact pressure for at least a low current for test purposes, while at full operating speed the pressure must be sufficient to provide the necessary current-carrying ability for the full rated current of the diode. The pressure must not be permitted to become so great, however, that mechanical failure could occur.

The problem is mounting all the necessary components of the rectifier circuit with the disc-type diodes and with adequate heat sinks to dissipate the heat, together with satisfactory springs or other force applying means to provide the necessary contact pressures, has been an extremely difficult one. As pointed out above, the components must also be adequately supported against the high rotational forces which occur in service and must be mounted as compactly as possible because of the limited space available. These requirements have made the type of assembly previously used unsuitable for disc-type diodes so that a new and more suitable arrangement is necessary.

SUMMARY OF THE INVENTION

In our copending application Ser. No. 232,085, filed Mar. 6, 1972, now U.S. Pat. No. 3,721,843, issued Mar. 20, 1973, and assigned to the assignee of the present invention, there is disclosed a rotating rectifier assembly in which disc-type diodes and the other necessary components are assembled in modules which are mounted as unitary assemblies on two support wheels and connected together in a rectifier bridge circuit. The general arrangement and the electrical circuits of this assembly, however, were similar to those shown in the prior patents mentioned above, requiring two wheels carrying diodes of opposite polarity with interconnecting wiring to complete the rectifier bridge circuit.

In accordance with the present invention, modular rectifier assemblies are utilized each of which has a base member carrying two diode assemblies. Each diode assembly consists of a disc-type diode placed between two metal heat sinks, with springs for applying the necessary force to the diode assembly to maintain the desired contact pressures as explained above. The diode assemblies are placed on the base member in such a manner that they are of opposite polarity with respect to the base, and terminal means are provided on the base member, preferably between the two diode assemblies, for connection to the alternating current exciter. Fuses are disposed adjacent each of the diode assemblies, and the diode assemblies and fuses and connected together for connection to the output leads of the rectifier assembly. Any necessary capacitors may be mounted in the base member and other components may be included as required. A suitable number of these modular assemblies is mounted on the rim of a single support wheel, and since each module includes diodes of opposite polarity, they can be connected in a rectifier bridge circuit and the complete rotating rectifier assembly is thus provided on a single wheel in a very compact arrangement.

BRIEF DESCRIPTION OF THE DRAWINGS

The invention will be more fully understood from the following detailed description of a preferred embodiment, taken in connection with the accompanying drawings, in which.

DESCRIPTION OF THE PREFERRED EMBODIMENT

Figure 1:
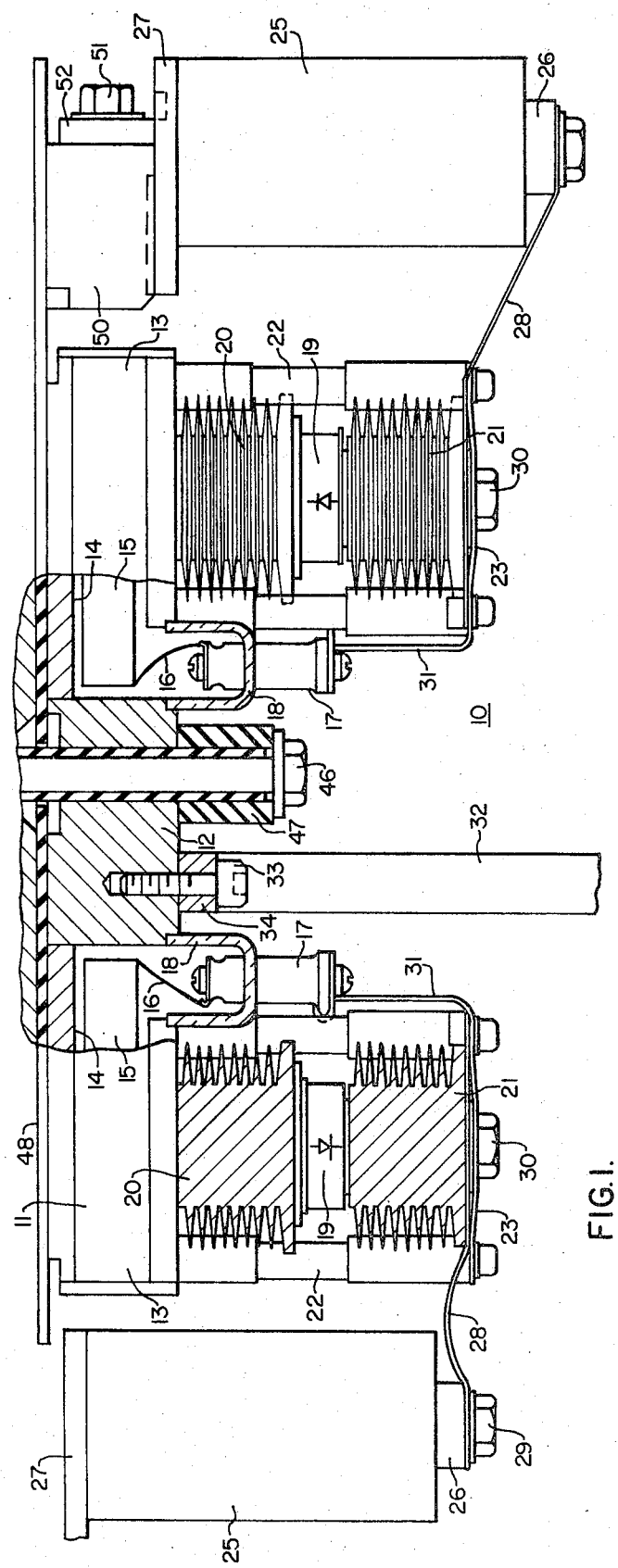
FIG. 1 is a view in elevation and partly in longitudinal section showing a rectifier module embodying the invention.
Figure 2:
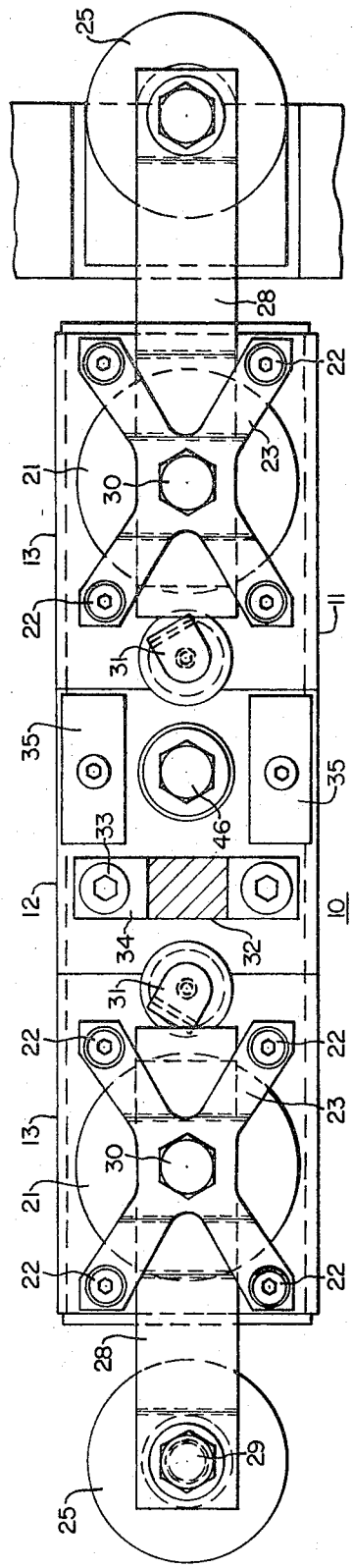
FIG. 2 is a bottom view of the rectifier module of FIG. 1.

As previously indicated, the present invention involves the use of a modular rectifier assembly, a plurality of modules being used to make up the complete rotating rectifier on a single support wheel. A rectifier module 10 of the preferred construction is shown in FIGS. 1 and 2.

The rectifier module 10 includes a conductive base member generally designated 11 which may comprise a central terminal member 12 with a diode mounting portion 13 on each side thereof. The terminal member 12 and mounting portions 13 may be secured together in conductive relation in any desired manner as by brazing or welding, or may be an integral member. The mounting portions 13 are preferably made in the form of hollow containers, such as rectangular metal boxes as shown in the drawing, with a internal recess 14. A capacitor 15 is disposed in one or both of the recesses 14, the capacitors being of any suitable type having one terminal in contact with the member 13, and may be secured in place by a suitable resin or other suitable means. The other terminal of each capacitor has a lead 16 which is connected to a terminal member 17 mounted in a cup 18 of insulating material secured in an opening in the base portion 13.

Two diode assemblies are disposed on the base member 11, one being mounted on each of the mounting portions 13. Each diode assembly consists of a rectifier diode 19 of the disc, or pressure contact, type and two heat sinks 20 and 21. The heat sinks may each be a block of aluminum or copper, or other suitable electrically and thermally conducting material capable of acting as a heat sink, preferably having peripheral fins as shown to increase the radiating surface and heat dissipating ability. The mass of the heat sinks is made such that at the normal operating speed of the rotating rectifier assembly, the force applied to the diode 19 is sufficient to provide the required electrical contact pressure and current-carrying ability but not great enough to risk the possibility of mechanical damage to the diode. The upper heat sink 20 directly engages the conductive base member 11 and the diode 19 is in electrical contact with both heat sinks 20 and 21. The two diode assemblies are placed on the opposite mounting portions 13, as shown, and are disposed so as to be of opposite polarity with respect to the base member as indicated diagrammatically in FIG. 1.

Each of the diode assemblies is held in place on the base 11 by a spring support which also provides the desired contact pressure at standstill. For this purpose each diode assembly is provided with four insulating posts of standoff insulators 22 of any suitable type which are mounted on the base member 11. The posts 22 are placed in a generally rectangular arrangement around each diode assembly, as can be seen in FIG. 2, and support spring members 23 which may be made of spring steel or other suitable material. The spring members 23 are of generally X-shaped configuration with their extremities attached to the lower ends of the four posts 22. The center of each spring 23 engages the lower heat sink 21, shims or spacers being inserted between the spring and the heat sink as required to obtain the desired spring deflection and spring force on the diode assembly. The spring force is made sufficient to provide the necessary pressure to hold the diode assembly in position against the base member when the rectifier assembly is at standstill, and to provide the necessary contact pressure to carry at least a small current for test purposes when the assembly is at standstill. If desired, however, the spring force could be made great enough to provide part or all of the contact pressure necessary during normal operation or to provide for any desired current-carrying capacity at standstill.

A fuse 25 is disposed adjacent each of the diode assemblies and preferably on the opposite side of the diode assembly from the terminal member as shown in the drawings. The fuses 25 may be any suitable type of fuse capable of operation at high rotational speed, and each fuse has a lower terminal 26 and a metal cap 27 which serves as an upper terminal member. Each fuse 25 is connected to its associated diode assembly by a copper strap connector 28 which is attached to the lower terminal 26, as by a screw 29, and which is connected to the lower heat sink 21 by a screw 30 which extends through an opening at the center of the spring 23 and is threaded into the heat sink. The capacitor terminal 17 is also connected to the lower heat sink 21 by a connector 31 which extends into contact with the connector 28. The diode assemblies and fuses may be the same on both sides of the base member 11 except for the opposite polarity of the diodes. The fuse 25 at one side may be displaced somewhat from the position corresponding to the fuse at the other side, as shown in FIG. 1, to permit the mounting of one fuse on a common segment with other fuses as more fully explained hereinafter. As shown in FIG. 1, a capacitor 15 is preferably connected across each of the diode assemblies. The purpose of the capacitors is to reduce or prevent voltage spikes, and it may not be necessary in all cases to provide capacitors across both diodes so that one of the capacitors 15 may be omitted, if desired, or both capacitors may be omitted if not needed. A relatively heavy copper conductor 32 is connected to the terminal member 12 in any suitable manner, as by screws 33 extending through shoulders 34 on the conductor. If necessary or desirable balance weights 35 may be attached to the terminal member 12 adjacent the center of the assembly. Any necessary voltage dividing resistors may also be included in the assembly in any desired manner.

Figure 3:
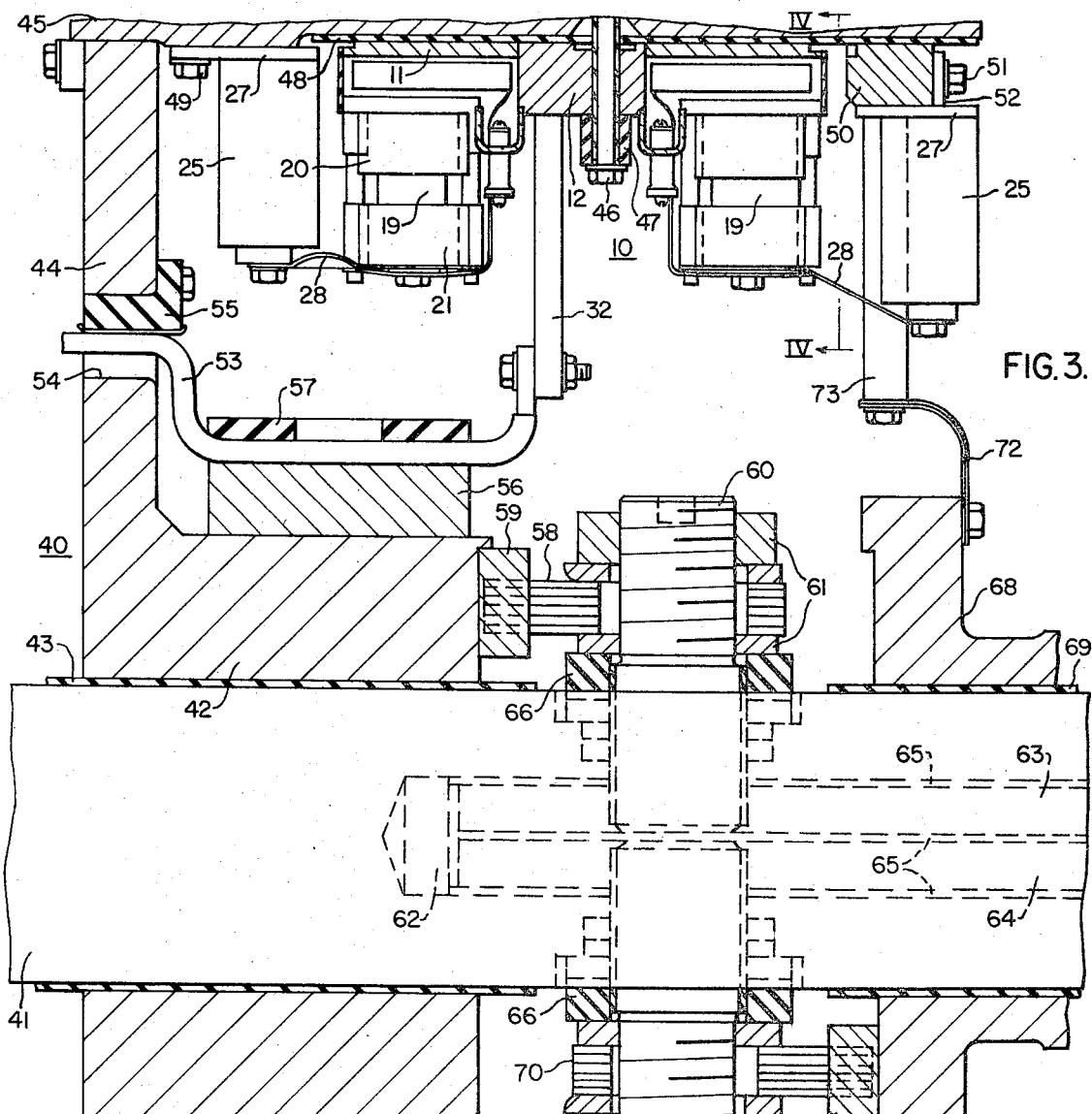
FIG. 3 is a longitudinal sectional view of a rotating rectifier assembly.
Figure 4:
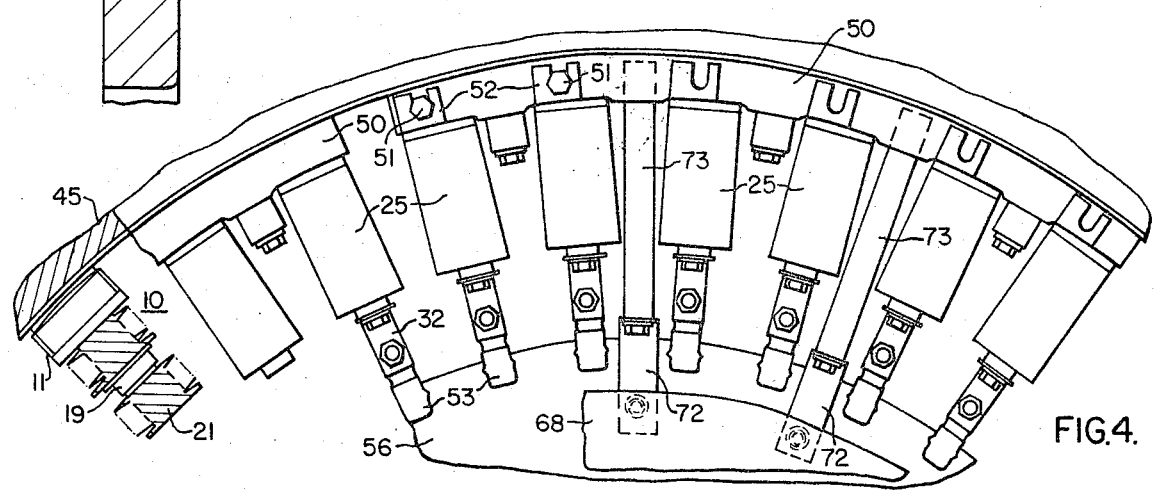
FIG. 4 is a fragmentary end view, partly in section on the line IV—IV of FIG. 3.

A rotating rectifier assembly in which the module 10 may be used is shown in FIGS. 3 and 4. As there shown, a rectifier support wheel 40 is mounted on a shaft 41. The wheel has a hub portion 42 which engages the shaft 41 but is insulated from it by a layer of suitable insulating material indicated at 43. The wheel also has a radial flange portion 44 which may be integral with the hub portion 42 and a longitudinally extending rim 45 which is generally cylindrical and which extends axially from the flange 44. The elements of the wheel 40 are made sufficiently heavy, as shown in the drawings, to have the necessary mechanical strength and electrical current-carrying capacity since the wheel itself is a part of the rectifier circuit as will be explained hereinafter.

A plurality of the rectifier modules 10 is mounted on the inner cylindrical surface of the wheel rim 45. The base member 11 of each module 10 is mounted on the wheel rim by means of a mounting bolt 46 which extends through an opening in the terminal portion 12 of the base member and is insulated therefrom by an insulating bushing and sleeve indicated at 47. The base 11 is insulated from the wheel rim 45 by a layer of insulation 48. The fuse 25 at the end of the module adjacent the flange 44 is electrically connected directly to the wheel rim 45 by a screw 49 which attaches the terminal 27 of the fuse to the wheel rim. The fuse 25 at the other or outer end of the wheel is insulated from the wheel rim, and preferably the fuses at this end of the wheel are connected in groups by attaching them to conductive segments 50. The segments 50 are bolted to the wheel rim and are insulated therefrom, preferably by the insulation layer 48 which may be extended to the end of the wheel rim as shown in FIG. 3. The fuses 25 at that end of the wheel are attached and electrically connected to the segments 50 by means of screws 51 engaging lugs 52 on the terminals 27 of the fuses.

The terminal member 12 of each module 10 is electrically connected to the alternating current exciter which forms a part of the brushless excitation system. A plurality of leads from the exciter extends along the shaft 41 and, as illustrated in FIG. 3, each lead 53 passes through a window or opening 54 in the flange 44 of the rectifier wheel 40 and is supported therein by a suitable insulated clamp or support 55. The lead 53 extends axially over the wheel hub 42 and is secured thereon in a support ring 56 in any suitable manner, as by insulating wedges 57 holding the leads 53 in slots in the ring 56. Each lead 53 is connected to the connector 32 of a terminal member 12 to effect electrical connection to the module 10.

As previously indicated, the wheel 40 itself forms part of the electrical circuit and the fuse 25 at the inner end of the module 10 is directly connected to the wheel rim 45. The circuit extends from the rim through the flange 44 and hub 42 and a connector 58 is attached to the hub 42 by means of a connector 59 of any suitable type. The connector 58 is a heavy copper connector, preferably of laminated construction as shown to provide a degree of flexibility, and is connected to a radial stud 60 clamping between nuts 61. The shaft 41 has an axial bore 62 therein, and leads 63 and 64 extend axially through the bore 62 and are insulated from each other and from the shaft as indicated at 65. The leads 63 and 64 constitute the output leads of the rotating rectifier and extend through the shaft 41 for connection to a generator field winding in the conventional manner. The radial stud 60 extends radially through the shaft 41 and is threaded into the lead 63, the stud 60 being suitably insulated from the shaft 41 by insulating members indicated at 66.

Another radial stud 67 is provided opposite the stud 60 and is threaded into the other axial output lead 64. The stud 67 is similar to the stud 60 and is similarly insulated from the shaft. A collector ring 68 is mounted on the shaft 41 for rotation therewith and is insulated from the shaft by a layer of insulating material 69. A heavy copper connector 70 similar to the connector 58 is attached to the stud 67 and is connected to the collector ring 68 by a suitable connector 71. As previously indicated, the fuses at the outer or right hand end of the wheel 40 are preferably mounted in groups on the segments 50, being thus connected together while each fuse is individually connected to its associated diode assembly. Each segment 50 is connected to the collector ring 68 by one or more connectors 72 and 73 to complete the circuit to the lead 64.

Figure 5:
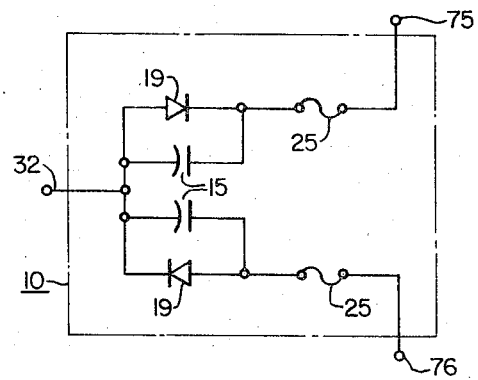
FIG. 5 is a schematic diagram showing the electrical circuit of a single rectifier module.

The electrical circuit of each of the modules 10 is shown schematically in FIG. 5. As there shown the two diodes 19 are connected to the terminal 32 with opposite polarity and the fuses 25 provide terminals indicated at 75 and 76 respectively. This circuit arrangement makes it possible to connect the modules very simply in a three-phase rectifier bridge to form part of a complete brushless excitation system. Referring to FIG. 3, the complete circuit including each module 10 extends from the exciter lead 53 through the connector 32, terminal member 12, left hand diode 19, fuse 25, wheel rim 45, flange 44, hub 42, connector 58 and stud 60 to the positive output lead 63. The return circuit extends from the negative lead 64 to the stud 67, connector 70, collector ring 68, connectors 72 and 73, segment 50, fuse 25, right hand diode 19 and connector 32 to the exciter lead 53.

Figure 6:
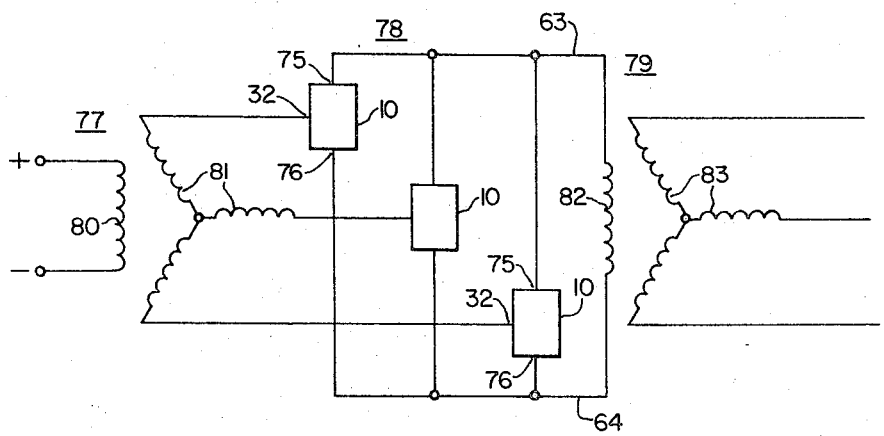
FIG. 6 is a simplified schematic diagram of a brushless excitation system.

A simplified diagram of a typical brushless excitation system utilizing the modules 10 is shown in FIG. 6. As there shown, the system includes an alternating current exciter 77 and a rotating rectifier assembly 78 supplying field excitation to a main alternating current generator 79. The alternating current exciter 77 has a stationary field structure carrying a field winding 80 excited with direct current from any suitable source and has a rotating armature carrying a three-phase winding 81 although any suitable winding configuration could be utilized. The rotating rectifier assembly 78 is connected to the exciter armature winding 81 and supplies direct current field excitation to the field winding 82 of the main generator 79. The generator 79 has an armature winding 83 on its stator, and the exciter armature 81, the rotating rectifier assembly 78 and the generator field winding 82 all rotate together on a common shaft.

In the simplified circuit of FIG. 6, the rectifier circuit is made up of one rectifier module 10 for each phase of the exciter armature winding 81. As shown, each phase lead of the exciter is connected to the terminal 32 of a corresponding rectifier module 10, and the terminals 75 and 76 of the module are connected to the two output leads 63 and 64 as previously described. It will be seen from FIGS. 5 and 6 that a complete three-phase rectifier bridge circuit is provided in this way, each module 10 being capable of forming one branch of such a bridge circuit.

Figure 7:
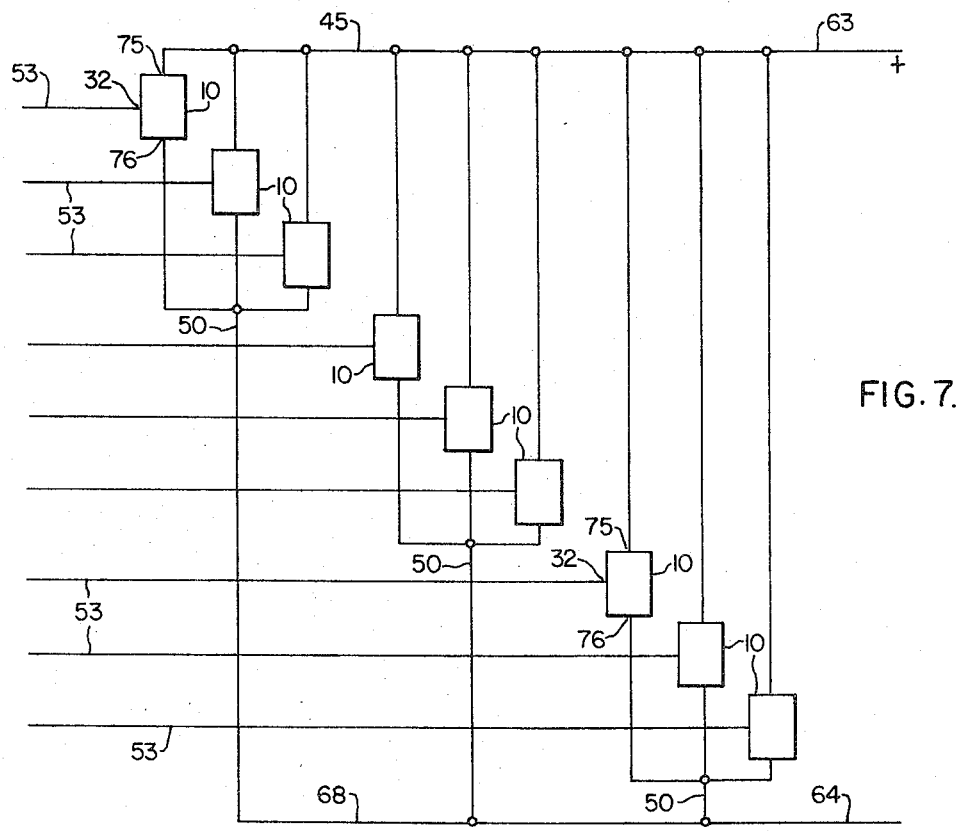
FIG. 7 is a schematic diagram of a rotating rectifier assembly.

In most cases, it will be desirable to provide a larger number of modules 10 to obtain the desired total excitation current for the generator 79 and this can readily be done by mounting any desired number of modules on the single wheel 40. Any desired circuit configuration of the exciter armature winding 81 can also be provided for. Thus, the exciter winding may have a number of branches in each phase and these branches may all be paralleled, or they may be paralleled in groups, or they may have individual leads. The necessary number of leads for any of these various circuit configurations can be carried along the shaft 41 to the rectifier wheel 40 and suitably connected to the necessary number of modules 10. Thus, for example, FIG. 7 shows by way of illustration an arrangement in which three leads 53 come from each phase of the exciter winding 81. Each of the leads 53 is connected to the terminal 32 of a module 10, and the terminals 75 of the modules are connected through the wheel rim 45 as previously described to the output lead 63. The terminals 76 of the modules 10 may be connected together by means of segments 50 and connected through the collector ring 68 to the output lead 64. It will be apparent that any desired circuit configuration can readily be provided for by the proper number and arrangement of modules 10.

It is to be understood, therefore, that although certain particular circuit arrangements have been shown for the purpose of illustration, other arrangements are equally possible. Thus, greater current carrying capacity can be obtained by connecting two or more modules 10 together in parallel for connection to each of the exciter leads 53 or, if desired, a greater number of diode assemblies could be provided in each module. Similarly, any necessary number or arrangement of capacitors and voltage dividing resistors could be included in the modules 10 in any necessary or desired arrangement.

It should now be apparent that a rotating rectifier assembly has been provided which makes it possible to obtain a three-phase rectifier bridge of large current capacity on a single rectifier wheel thus providing a much more compact assembly than has previously been possible. The new arrangement also permits great flexibility in the use of different circuit configurations and can be used with any desired type of exciter armature winding.

What is claimed is:

1. In a brushless excitation system including an alternating current exciter and a rotating rectifier assembly having a rectifier wheel mounted on a shaft and insulated therefrom, a rectifier module adapted to be mounted on said wheel, said module comprising conducting base means, two diode assemblies, each of said diode assemblies having a disc-type rectifier diode disposed between two heat sinks in electrical and thermal contact therewith, one heat sink of each diode assembly engaging the base means and the two diode assemblies being disposed so that the diodes are of opposite polarity with respect to the base means, spring means for applying force to the other heat sink of each diode assembly to maintain contact between said one heat sink and the base means and between the diode and the heat sinks of each assembly, a fuse adjacent each diode assembly, means for electrically connecting each fuse separately to the adjacent diode assembly, and means for making electrical connection to the base means.

2. A rectifier module as defined in claim 1 in which said base means includes means for mounting a capacitor, and means for connecting the capacitor across at least one of the diodes.

3. A rectifier module as defined in claim 1 in which the base means includes a terminal member disposed between the two diode assemblies, and means for making electrical connection to said terminal member.

4. A rectifier module as defined in claim 3 in which the fuses are on opposite sides of the diode assemblies from the terminal member, and means for electrically connecting each fuse to the adjacent diode assembly.

5. A rectifier module as defined in claim 3 in which the base member has a recess on each side of the terminal member, a capacitor disposed in each recess, and means for connecting each capacitor across one of the diodes.

6. In a brushless excitation system including an alternating current exciter and a rotating rectifier assembly, said rectifier assembly having a rectifier wheel mounted on a shaft and insulated therefrom, said wheel having an axially extending rim portion, a plurality of rectifier modules mounted on said rim portion, each of said modules having base means secured to the rim portion and insulated therefrom, two diode assemblies engaging the base means in conductive relation therewith, each diode assembly including a rectifier diode and the two assemblies having opposite polarity with respect to the base means, means for electrically connecting the base means of each module to a lead of said alternating current exciter, means for connecting one diode assembly of each module to one direct current output lead, and means for connecting the other diode assembly of each module to another direct current output lead.

7. The combination of claim 6 and including an individual fuse adjacent each diode assembly and connected thereto, and means for connecting one fuse of each module to one output lead and the other fuse of each module to the other output lead.

8. The combination of claim 7 in which one fuse of each module is connected to the rectifier wheel, means for connecting the wheel to one output lead, and means for connecting the other fuse of each module to the other output lead.

9. The combination of claim 6 in which each diode assembly includes a disc-type rectifier diode disposed between two heat sinks in electrical and thermal contact therewith with one of said heat sinks engaging the base means, and spring means for applying a force to the other heat sink to maintain contact between the diode, the heat sinks and the base means.

10. The combination of claim 9 including an individual fuse adjacent each diode assembly and connected thereto, means for connecting one fuse of each module to one output lead, and means for connecting the other fuse of each module to the other output lead.

11. The combination of claim 10 in which one fuse of each module is connected to said rectifier wheel, a connector ring mounted on the shaft and insulated therefrom, means for connecting the other fuse of each module to said ring, means for connecting said wheel to one output lead, and means for connecting said ring to the other output lead.

12. A rotating rectifier assembly for a brushless excitation system of an A.C. generator, comprising:
 a wheel of conductive material including a hub mounted on a shaft, a flange extending radially from said hub, and a rim extending axially from said flange at a location radially removed from said shaft;
 a ring of conductive material mounted on said shaft axially displaced from said hub and located axially proximate an extremity of said rim;
 a rectifier module mounted by a conductive base member on said rim facing said shaft and comprising a terminal for connection with a lead supplying alternating current and voltage thereto, a pair of oppositely poled diodes connected to said terminal by said base member and having at least one heat sink in thermal contact therewith, said diodes being axially displaced from each other, and said conductive base member being insulated from direct contact with said rim;

a first fuse mounted on and in conductive contact with said rim and having a radially inward end conductively connected to a radially inward end of one of said diodes;

a second fuse mounted on said rim, insulated from direct contact therewith, having a radially inward end conductively connected to a radially inward end of one of said diodes and having an end proximate said rim conductively connected to said ring.

13. The subject matter of claim 12 wherein:
said terminal, said diodes and said fuses are in an axial line extending on only one side of said flange.

14. The subject matter of claim 13 wherein:
in sequence from said flange are located said first fuse, one of said diodes, said terminal, the other of said diodes and said second fuse.

15. The subject matter of claim 13 wherein:
each of said diodes is a pressure contact diode with heat sink members on radially opposite sides of each in direct thermal and electrical contact therewith, and further comprising spring means maintaining pressure contact between said diodes and said heat sinks.

16. The subject matter of claim 13 further comprising:
means for conductively connecting said hub to a first conductor extending axially through the interior of said shaft and means for conductively connecting said ring to a second conductor extending axially through the interior of said shaft.

* * * * *